United States Patent [19]

Chapman

[11] Patent Number: 5,206,980
[45] Date of Patent: May 4, 1993

[54] APPARATUS FOR ALIGNING ENDS OF PIPES

[76] Inventor: Johnny D. Chapman, 2469 Barrow Rd., Douglasville, Ga. 30134

[21] Appl. No.: 864,842

[22] Filed: Apr. 7, 1992

[51] Int. Cl.⁵ .............................................. B23P 19/04
[52] U.S. Cl. ........................................ 29/237; 29/252; 269/43; 254/29 R
[58] Field of Search ................ 29/237, 282, 280, 267, 29/252; 254/29 R; 269/43; 228/49.3, 44.5, 47

[56] References Cited

U.S. PATENT DOCUMENTS

| | | | |
|---|---|---|---|
| 3,207,326 | 9/1965 | Enix | 29/237 |
| 3,653,115 | 4/1972 | Perkins | 29/237 |
| 3,729,360 | 4/1973 | McElroy . | |
| 3,846,208 | 11/1974 | McElroy . | |
| 3,988,819 | 11/1976 | Sato | 29/237 |
| 4,008,118 | 2/1977 | Wesebaum . | |
| 4,071,395 | 1/1978 | McElroy . | |
| 4,174,248 | 11/1979 | Carroll . | |
| 4,174,996 | 11/1979 | Hunter . | |
| 4,352,708 | 10/1982 | McElroy . | |
| 4,401,497 | 8/1983 | Wharthmann . | |
| 4,524,959 | 6/1985 | Kubo | 269/43 |
| 4,640,732 | 2/1987 | Stafford . | |
| 4,684,430 | 8/1987 | Handa . | |
| 4,714,513 | 12/1987 | McAlister . | |
| 4,769,889 | 9/1988 | Landman et al. | 269/43 |
| 4,790,057 | 12/1988 | Baker | 29/237 |
| 4,927,642 | 5/1990 | Kunz . | |
| 4,957,570 | 9/1990 | Jenkins . | |

FOREIGN PATENT DOCUMENTS 376757 7/1932 United Kingdom .................. 269/43

Primary Examiner—Robert C. Watson
Attorney, Agent, or Firm—Michael V. Drew

[57] ABSTRACT

A frame (20) which open at the bottom has supporting plates (22, 24, 26) and a bottommost support piece (28) connecting at least two support plates (22, 24, 26). The frame is designed to fit over lengths of pipes to be aligned. Two sets of (40, 41) clamps consisting of at least one clamp each are mounted on the frame (20). The sets of clamps (40, 41) are translatable with respect to one another. One set of clamps (40) engages one of the pipes (13) to be aligned. The other set of clamps (41) engages the other pipe (11) to be aligned. Once the pipes (11, 13) are engaged the facing ends are brought together by translating the sets of clamps (40, 41) toward each other. A roller (30) is affixed to one end of the frame (20) to facilitate movement of the apparatus (10) along a length of pipe.

7 Claims, 6 Drawing Sheets

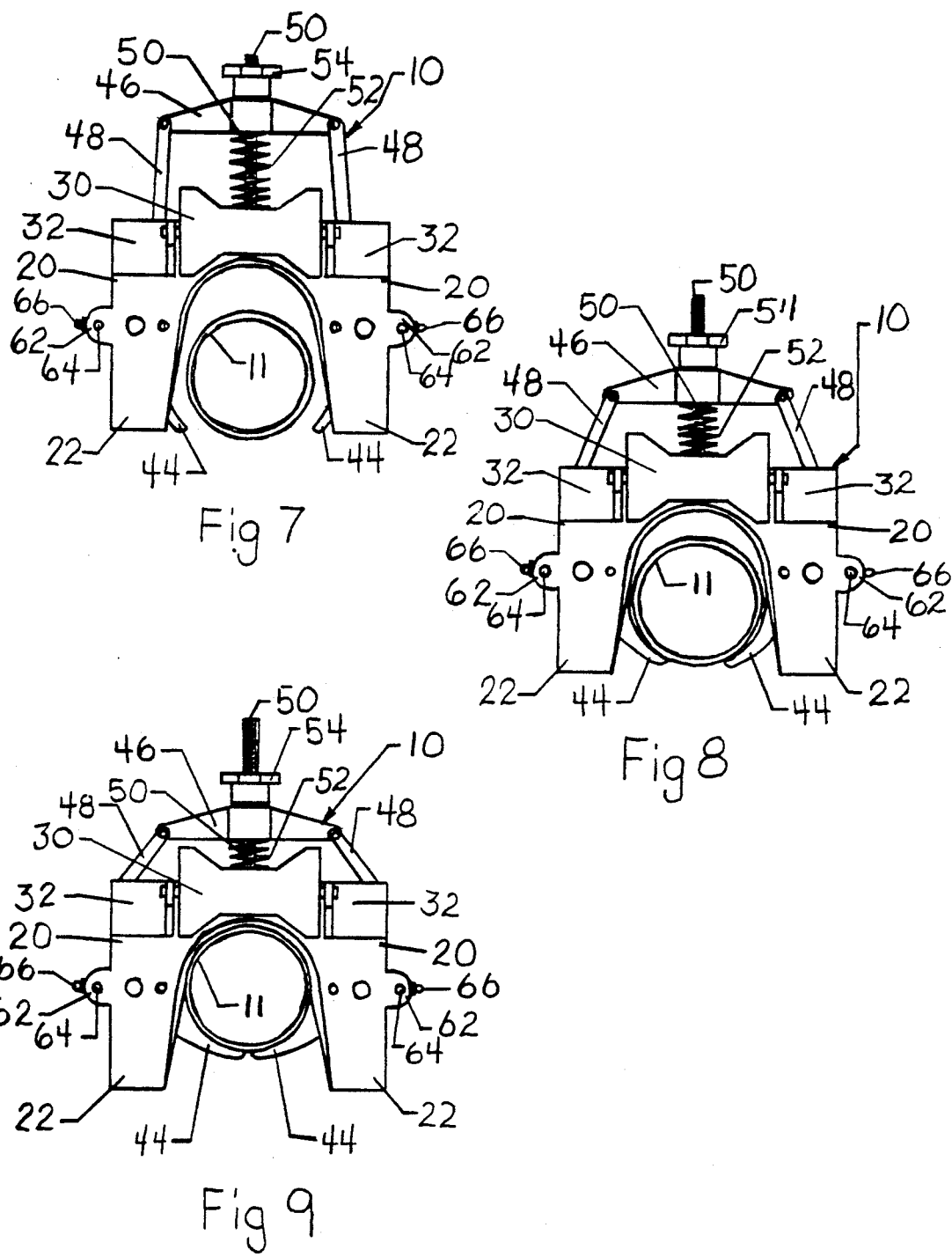

APPARATUS FOR ALIGNING ENDS OF PIPES

TECHNICAL FIELD OF THE INVENTION

The present invention relates to an apparatus for aligning the ends of pipes, and more particularly to an apparatus for aligning the ends of pipes lying on a surface so that they may be joined.

BACKGROUND OF THE INVENTION

It is often necessary to join separate lengths of pipes or tubing to create a single, continuous length. If the lengths of pipe are heavy, it is difficult to manipulate and move the pipes so that they may be properly aligned for joining. This problem arises when long sections of pipe such as polyethylene tubing are to be joined. The problem is even greater when pipe is laid in a trench and it becomes necessary to manipulate and move pipe lengths in the trench.

A device in which pipes are loaded thereupon through the top of the device are limiting in that piping has to be lifted and placed into the device and joined pipe must be lifted from the device upon completion of the joining process. Such a top-loading device would also be limiting because it would be necessary to provide a trench which is larger than necessary to lay the pipe in order to be able to remove the device from the trench once joining of pipe is completed.

SUMMARY OF THE INVENTION

It is an object of the invention to provide a means for aligning the ends of lengths of pipe or tubing.

It is a further object of the invention to provide a means for aligning the ends of lengths of pipe or tubing such as polyethylene pipe so that the ends may be joined.

In the present invention, an apparatus for aligning the ends of pipes has a frame which is open at the bottom. The frame is designed to fit over lengths of pipes to be aligned. Two sets of clamps consisting of at least one clamp each are mounted on the frame. The sets of clamps are translatable with respect to one another. One set of clamps engages one of the pipes to be aligned. The other set of clamps engages the other pipe to be aligned. Once the pipes are engaged the facing ends are brought together by translating the sets of clamps toward each other. A roller is affixed to one end of the frame to facilitate movement of the apparatus along the top of a length of pipe.

Other aspects, objects, features, and advantages of the present invention will become apparent to those skilled in the art upon reading the detailed description of preferred embodiments.

BRIEF DESCRIPTION OF THE DRAWINGS

FIG. 7 is a front elevational view of the invention of FIG. 1 shown prior to engagement of a pipe.

FIG. 8 is a front elevational view of the invention of FIG. 1 shown as the pipe is partially engaged.

FIG. 9 is a front elevational view of the invention of FIG. 1 shown as the pipe is fully engaged.

DETAILED DESCRIPTION OF PREFERRED EMBODIMENTS OF THE INVENTION

While the specification concludes with claims particularly pointing out and distinctly claiming the subject matter which is regarded as the present invention, the invention will now be described with reference to the following description of embodiments taken in conjunction with the accompanying drawings. Throughout the drawings, the same numerals are used to refer to like elements of the invention.

Figure 1:
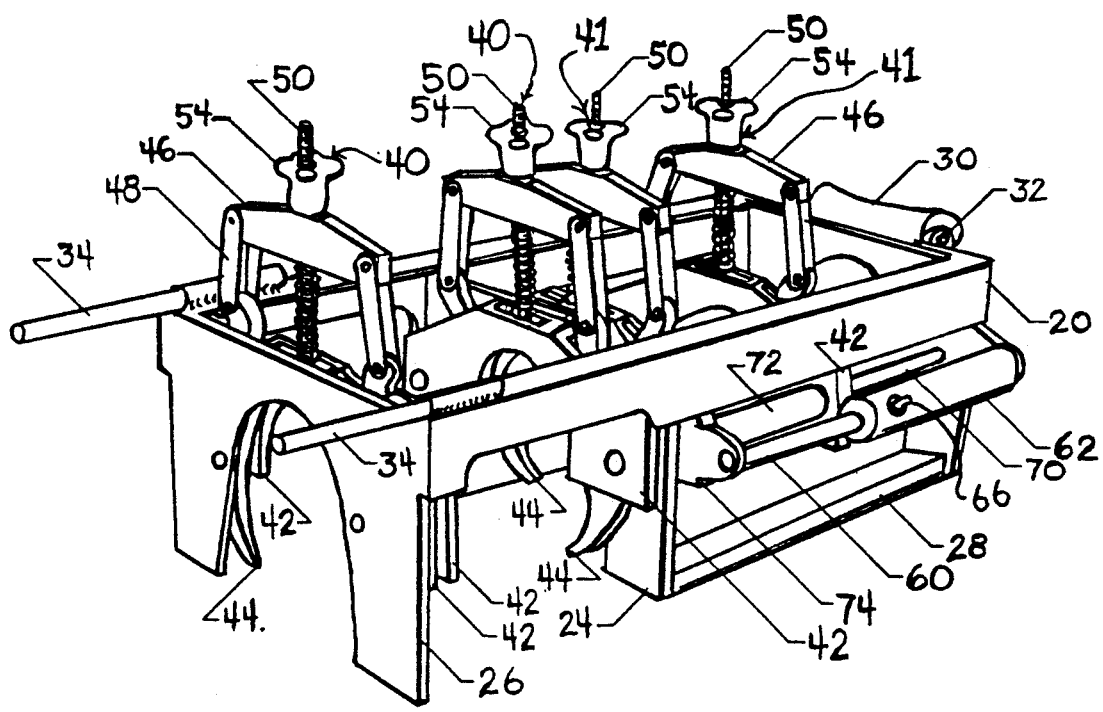
FIG. 1 is an isometric illustration of an apparatus for aligning ends of pipes.

In a preferred embodiment of the invention an apparatus for aligning the ends of pipes has a frame which is open at the bottom. There are two sets of clamps that engage pipes and bring their ends together. Referring first to FIG. 1, therein is shown an apparatus for aligning the ends of pipes 10 according to a preferred embodiment of the invention. The apparatus 10 generally consists of a frame 20 and two sets of clamps 40, 41. The frame 20 is open at the bottom so that the apparatus 10 may be placed over a pipe. The frame 20 is supported upon three vertical plates 22, 24, 26 that have open areas extending toward their bottommost edges. A bottom support piece 28 extends between the frontmost plate 22 and the middle-positioned plate 24 to provide stability for that frontmost portion of the fame 10 and also helps to prevent the apparatus 10 from sinking into dirt upon which it may be placed. The apparatus 10 has a roller 30 attached to what for convenience may be considered the frontmost end of the apparatus 10 by means of a pair of brackets 32. The roller 30 enables the apparatus to be rolled along the top of a pipe. Handles 34 are attached to what for convenience is referred to as the rearmost end of the frame 20.

Each of two sets of two clamps are designed to respectively engage two separate lengths of pipe. Although each set of clamps may contain more or less than one clamp, the two-clamp per set arrangement works well in the preferred embodiment to provide sufficient stability. The clamps 40 of the rearward set are stationary while the forward clamps 41 are moveable with respect to the frame 20 and the rearward clamps 41. Each set of clamps is designed to engage the end portion of a length of pipe. The moveable set of clamps 41 may be moved to abut the end of the pipe engaged thereby with the end of the pipe engaged by the stationary clamps 40. Each clamp 40, 41 is identically constructed and will be discussed in greater detail below. Although other types of clamps which adequately engage a pipe from the bottom of the clamp may be suitable, each clamp 40, 41 of the preferred embodiment is a toggle type of clamp. For example, bottom-opening power-driven clamps may be used. In each clamp 40, 41, a fixed jaw portion 42 supports two pivotable jaw portions 44. A cross-bar, or T-member, 46 provides the moving force the causes the jaws 44 to pivot and thus open and close. The cross-bar 46 is connected to the pivotable jaws by connecting bars 48 on either side of the cross-bar 46. A threaded rod 50 extends vertically through each cross-bar 46. A knob-like nut 54 having threads to receive the threaded rod 50 is fitted over the threaded rod 50 and rests on top of the cross-bar 46. A helical spring 52 places upward tension upon the cross-bar 46. A clamp 40, 41 is in its most open position when the cross-bar 46 is at its highest position on the threaded rod 50. A clamp 40, 41 closes as the knob 54 is turned to move the cross-bar 46 downward against the tension of the spring 52. Although other spring or mechanical biasing elements may be used, the helical spring 52 works well in the toggle type clamp of the preferred embodiment illustrated. A piston 60 capable of being hydraulically driven is used to move the moveable clamps 41. The piston 60 and its sleeve are mounted upon the frame 20. The piston sleeve has an anterior port (not seen in this view) and a posterior port 66 for receiving and expelling the hydraulic fluid medium, liquid or gaseous, from the sleeve 62. The fixed jaws 42 of the moveable clamps 41 are attached to a cylinder 72 which slides along a rod 70 attached to the frame 20. The cylinder 72 in turn is connected to the piston 60 by a connecting plate 74. As the piston 60 is moved to a position into or out of the sleeve 62, the cylinder 72 translates the clamps 41 to a position farther away from or closer to the stationary clamps 40.

Figure 2:
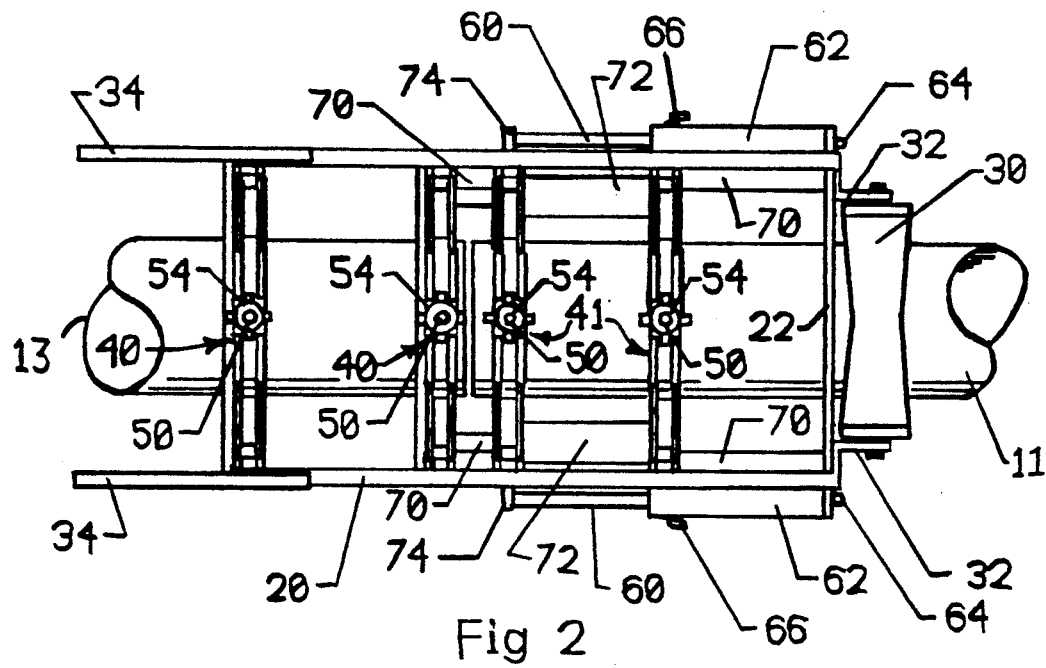
FIG. 2 is a top plan view of the invention of FIG. 1 mounted upon two lengths of pipe which have been joined.

Referring now to FIG. 2, in addition to elements which have been discussed above, FIG. 2 illustrates two lengths of pipe 11, 13 which have been aligned by the apparatus 10. One length of pipe 11 has been engaged by the moveable clamps 40 while the other pipe 13 has been engaged by the stationary clamps 41. The ends of the two pipes 11, 13 have been aligned and brought together. In this view, there can be seen the attachment of a piston 60, sleeve 62 and cylinder 72 to each side of the apparatus 10. Both the anterior ports 64 and posterior ports 66 of each piston can be seen in this view.

Figure 3:
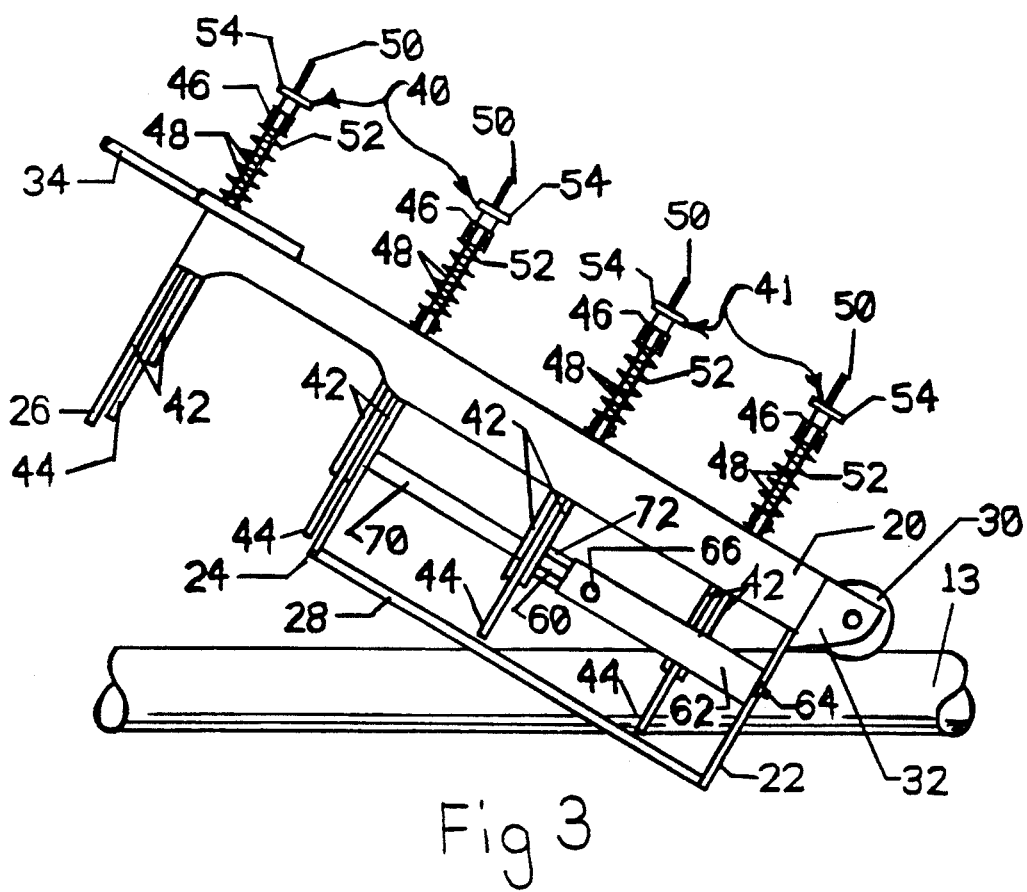
FIG. 3 is a side elevational view of the invention of FIG. 1, in position to roll along the top of a pipe.

Referring now to FIG. 3, therein is illustrated a side elevation view of the apparatus 10 positioned to roll along a pipe 13 by means of the roller 30 attached to the frontmost portion of the frame 20.

Figure 4:
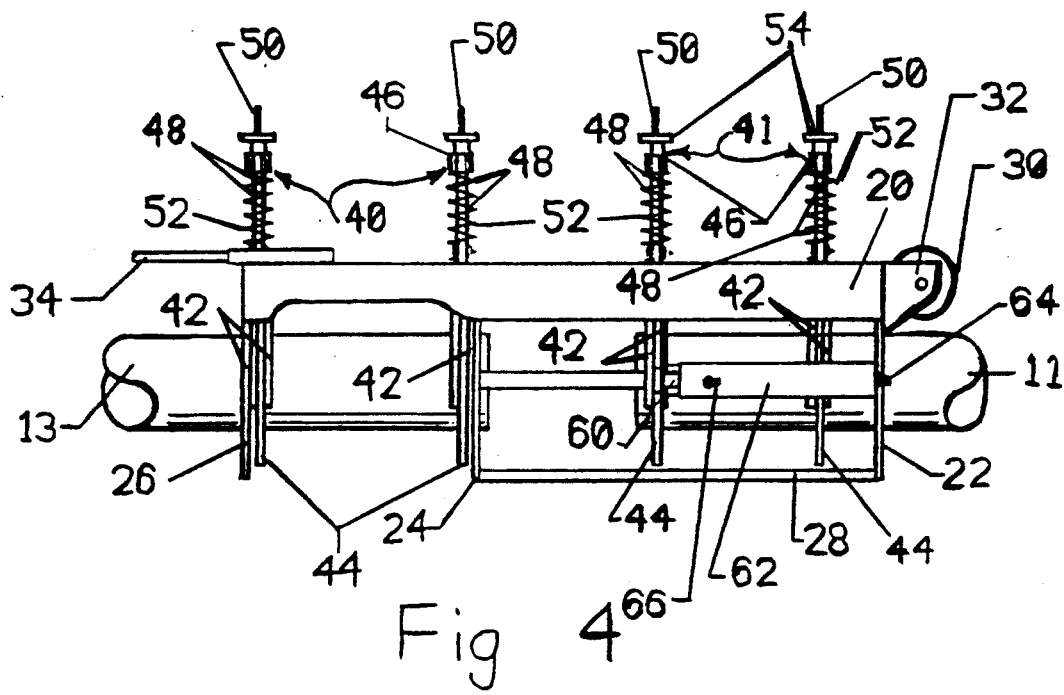
FIG. 4 is a side elevational view of the invention of FIG. 1 shown with the moveable set of clamps retracted toward the front of the frame of the apparatus away from the set of stationary clamps.
Figure 5:
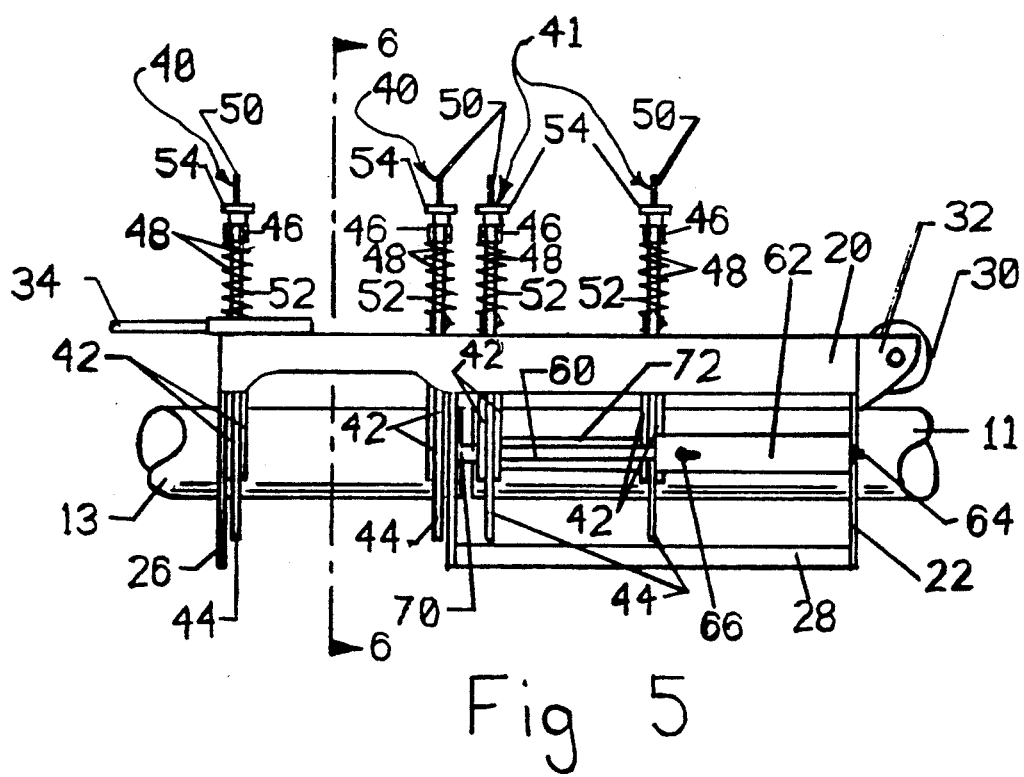
FIG. 5 is the same side elevational view of the invention of FIG. 4 with the moveable set of clamps extended away from the front of the frame toward the set of stationary clamps.

Referring now to FIG. 4 and FIG. 5 simultaneously, the two side elevational views illustrate the two extreme positions of the set of moveable clamps 41. In FIG. 4, the piston 60 is retracted into the sleeve 62 and has moved the clamps 41 to a position farthest away from the stationary clamps 40. This is the position in which a pipe 11 is engaged by the clamps 41 to be aligned with the pipe 13 which has been engaged by the stationary clamps 40. Referring now more particularly to FIG. 5, the moveable piston 60 has been extended from the sleeve 62 and moves the clamps 41 into a position closest to the stationary clamps 40. In this latter position, the end of the pipe 11 engaged by the moveable clamps 41 has been brought into closest alignment with the end of the pipe 13 engaged by the stationary clamps 40. Although the preferred embodiment of the apparatus 10 utilizes pistons 60 to move the cylinders 72 and clamps 41, other means may also be used, such as a simple lever mounted upon the frame 20 and attached to a cylinder 72.

Figure 10:
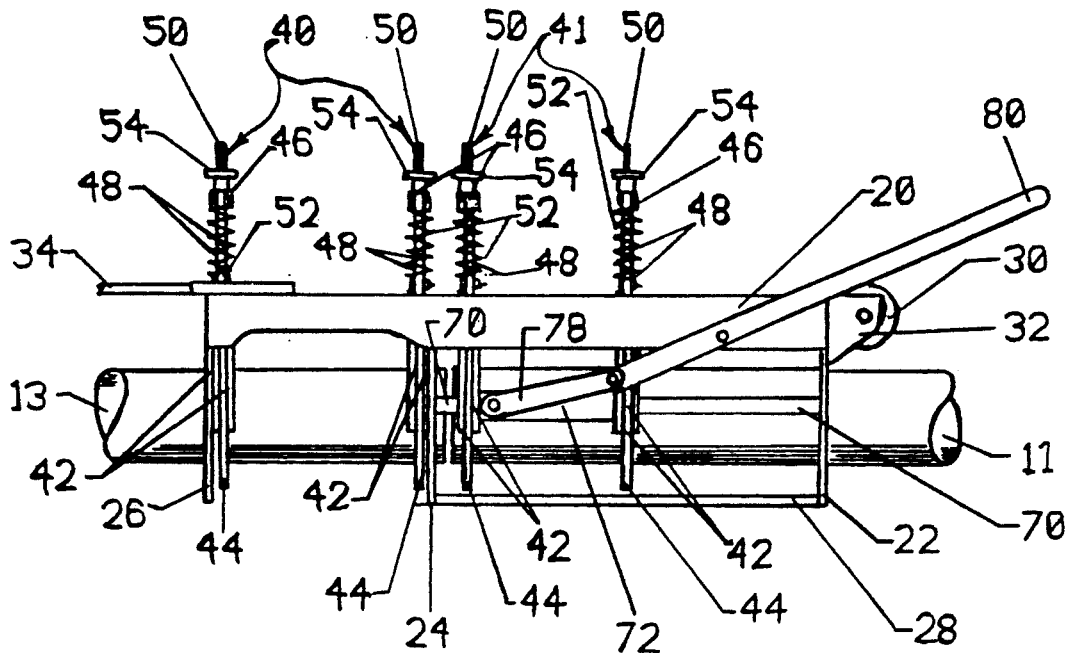
FIG. 10 is a side elevational view of an apparatus for aligning ends of pipe according to another preferred embodiment of the invention, wherein a lever rather than a piston is utilized to move the moveable set of clamps with respect to the stationary clamps.
Figure 11:
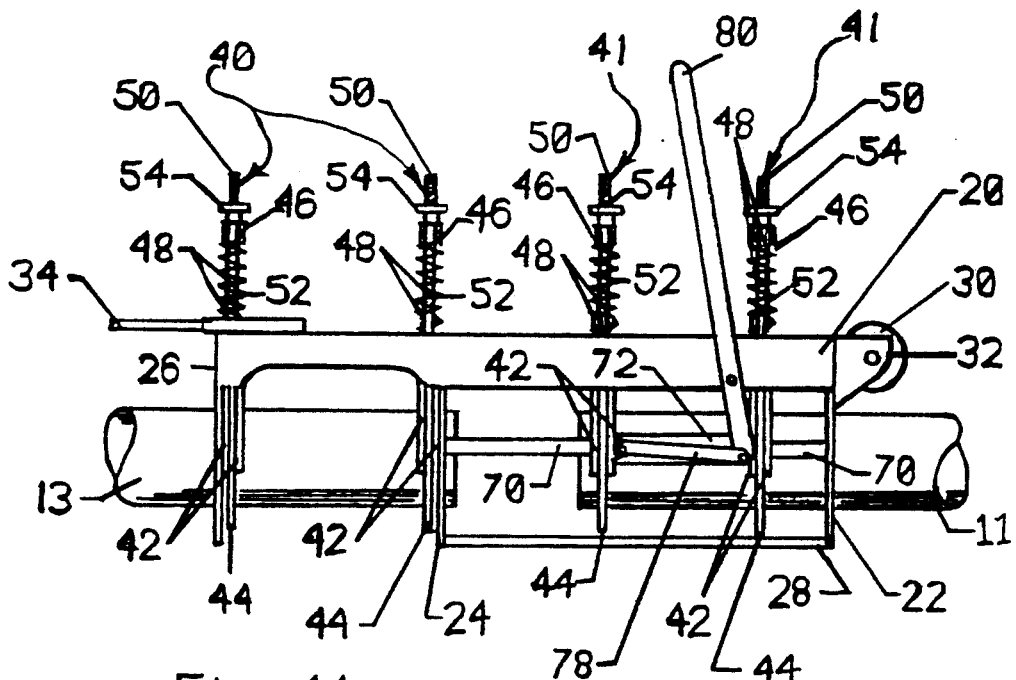
FIG. 11 is the same side elevational view of the apparatus of FIG. 10 wherein the lever has positioned the moveable set of clamps away from the front of the frame toward the set of stationary clamps.

Referring briefly to FIGS. 10 and 11, therein can be seen the use of a lever 80, to move the moveable clamps 41 and engaged pipe 11 toward the stationary clamps 42 and engaged pipe 13.

Figure 6:
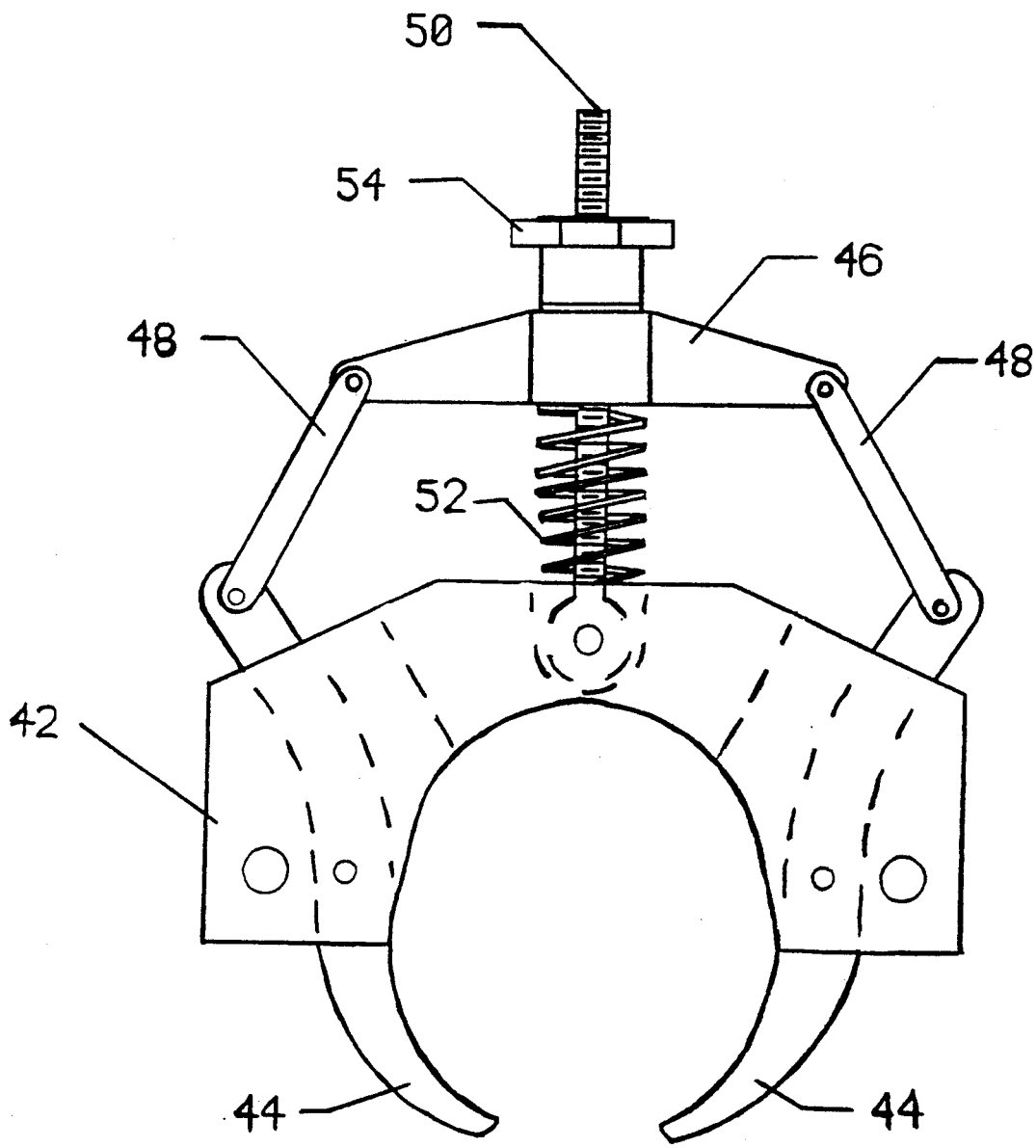
FIG. 6 is a sectional view of the invention of FIG. 1 as shown in FIG. 5 taken along line 6—6 of FIG. 5.

Referring now to FIG. 6, therein is illustrated a clamp 40 as seen through the sectional view of FIG. 5. As previously mentioned, each clamp is identical in the preferred embodiment of the apparatus 10. In the view of FIG. 6 is illustrated the alignment of the elements of the clamp 40, 41 previously described, namely, the fixed jaw 42, pivotable jaws 44, cross-bar 46, connecting pieces 48, threaded member 50, helical spring 52 and knob 54.

Referring now to FIGS. 7, 8 and 9 simultaneously, the lifting motion of the clamps 40, 41 is generally illustrated from a front elevational view of the apparatus 10. In FIG. 7, the apparatus 10 is shown place over a pipe 11 which is to be engaged. The threaded knob 54 is at a high position on the threaded rod 50 which allows the spring 52 to press the cross-bar 46 against the knob 54. This action in turn causes the pivotable jaws 44 to open to their widest position. In FIG. 8, as the knob 54 is turned the cross-bar 46 is forced downward causing the jaws 44 to close and engage the pipe 11 and lift it from its resting surface as the jaws 44 encircle the pipe 11. In FIG. 9, the knob 54 has been turned to force the cross-bar 46 to its lowest position and thus cause he jaws 44 to close. The pipe 11 now is fully enclosed by the jaws 44 and lifted from its resting surface.

In general operation, the apparatus 10 is placed over two lengths of pipe 11, 13 which are to be aligned for joining or other purposes. Prior to engagement of a pipe, the moveable clamps 41 are normally placed in a position farthest away from the stationary clamps 40. The apparatus 10 may be rolled or otherwise moved along pipes to a location wherein the stationary clamps are positioned over one pipe which is to be aligned and the moveable clamps 41 are positioned over the another pipe which is to be aligned. The apparatus 10 may be rolled along a pipe by positioning the apparatus 10 such that the roller 30 rests upon the top of the pipe and the remainder of the apparatus is lifted, as illustrated in FIG. 3. Rolling of the apparatus 10 and handling in general may be facilitated through use of the handles 34.

The pipes 11, 13 are engaged by respective clamps 40, 41 as previously described. As illustrated in the drawings and described above, each pipe 11, 13 is lifted from its resting surface when engaged by the pivotable jaws 44 of the clamps 40, 41. As the pivotable jaws 44 grip and lift a pipe, the top of the pipe is forced against the fixed jaw 42. When the moving jaws 44 fully seat the pipe against the fixed jaw 42 of each clamp 40, 41 the two pipes 11, 13 are axially aligned because of the alignment of the clamps 40, 41. The pivotable jaws 44 open at the bottom of the frame 20 of the apparatus 10 and, as shown in FIG. 7, at least partially encircle a pipe 11 when the apparatus 10 is placed over the pipe 11. There is little or no need to place pipes on blocks in order to align them for joining or other purposes. Pipes do not have to be lifted from the ground or other surface to be placed into a machine for alignment. The apparatus 10 generally lifts a pipe from the surface upon which it rests. When the ends of pipes are lifted by the apparatus 10 the pipes are automatically brought into horizontal alignment.

Once engaged, the pipes may be then be immediately brought together or worked upon for joining. For example, the facing ends of the two pipes 11, 13 may be shaved and then heated for quick joining. It is also possible with the apparatus 10 to move the ends of the pipes 11, 13 close together without actually causing the ends to contact each other so that they may be worked upon and subsequently joined from a minute distance apart.

In the preferred embodiment illustrated, the moveable clamps 41 are made to move, or translate, along an axis extending through the clamps 40, 41 by attaching hydraulic lines to the piston sleeves 62 and directing hydraulic fluid through the ports 64, 66 to extend or retract the piston 60. As previously mentioned, the moveable clamps 41 may also be moved, or translated, by use of a simple lever. For example, by attaching an end of a lever to one or both of the cylinders 72 and causing the lever to pivot about a point of attachment to the frame 20.

Although the preferred embodiment has been described with reference to stationary 40 and moveable 41 clamps, both sets of clamps 40, 41 may be moveable with respect to one another and the frame as well.

As illustrated, the apparatus 10 is narrow, and only needs to be wide enough to fit over pipe and support clamps 40, 41. Thus, the apparatus 10 may be placed in a trench or other location of limited space where pipes must be aligned. After one set of pipes is joined as described above, another set may be quickly joined by rolling the apparatus 10 along the top of the pipes just joined to the point of desired connection with another pipe. Also, upon completion of work on two sections of pipe, the apparatus 10 may be completely removed from the pipe by reversing the engagement action of the clamps 40, 41 to release the pipe and simply lifting or rolling the apparatus 10 away. There is no need to lift pipe from the apparatus 10 or maneuver pipe around the apparatus 10. This is especially important when pipes are joined in trenches. The trench only need be deep enough for placement of the pipe and wide enough for placement of the apparatus 10. This eliminates the need for trenches of much greater width and depth that are only necessary to join pipes when using traditional machinery or methods that require more space for use and are less advantageous than the invention. Smaller, shallower trenches save time and money during construction, and are safer than larger trenches wherein workers must stand. The ability to disengage joined pipe and the apparatus 10 without having to lift pipe from the apparatus 10 is also important in those instances when pipe which has been joined has its movement so restricted that the pipe cannot easily be moved in a direction perpendicular to the axis of the pipe, that is, the joined pipe cannot easily be lifted upward or moved sideways.

As should be apparent from the foregoing specification, the invention is susceptible of being modified with various alterations and modifications which may differ from those which have been described in the preceding specification and description. Accordingly, the following claims are intended to cover all alterations and modifications which do not depart from the spirit and scope of the invention.

What is claimed is:

1. An apparatus for aligning the ends of two pipes comprising:
    a frame having an open bottom and means for supporting said frame above a surface;
    a first plurality of clamp means fixedly attached proximate a first end of said frame, each having upper jaw means proximate an upper portion of said frame, a pair of cooperating lower jaws respectively pivotally connected to said upper jaw means so that said lower jaws are selectively openable and closable proximate said open bottom of said frame and further having means for selectively opening and closing said lower jaws;
    at least one guide rod coaxial to said first clamp means, attached to said frame proximate a second end of said frame distal said first end of said frame;
    at least one cylinder corresponding to each said guide rod slidably mounted thereon;
    a second plurality of clamp means attached to said at least one cylinder in axial alignment with said first plurality of clamp means, each having upper jaw means proximate an upper portion of said frame, a pair of lower jaws respectively pivotally connected to said upper jaw means so that said lower jaws are selectively openable and closable proximate said open bottom of said frame and means for selectively opening and closing said lower jaws;
    means for selectively translating each said cylinder along a corresponding said guide rod; and
    roller means for engaging a top of a pipe affixed at either end of said frame.

2. The invention of claim 1, said means for selectively translating said at least one cylinder along a corresponding said guide rod comprising lever means.

3. The invention of claim 1, said means for selectively translating said at least one cylinder along a corresponding said guide rod comprising piston means mounted upon said frame and attached to cylinder, and means for driving said piston, such that said cylinder translates together with a piston of said piston means.

4. The invention of claim 1, said means for selectively translating said at least one cylinder along a corresponding said guide rod comprising:
    a piston corresponding to and connected to each said cylinder; and
    a piston sleeve attached to said frame corresponding to and for receiving each said piston, having ports for receiving and expelling a hydraulic fluid.

5. The invention of claim 1, further comprising handle means for lifting said frame.

6. The invention of claim 1, wherein said clamp means comprises a spring-loaded toggle clamp.

7. An apparatus for aligning the ends of two pipes comprising:
    a frame having a first end, a second end, and an open bottom;
    at least one first bottom-opening clamp means for engaging a first pipe, fixedly attached to said frame;
    at least one second bottom-opening clamp means for engaging a second pipe, movably attached to said frame such that said second bottom-opening clamp means is translatable with respect to said first bottom-opening clamp means along an axis extending through said first bottom-opening clamp means and said second bottom-opening clamp means;
    means for translating said first bottom-opening clamp means with respect to said second bottom-opening clamp means; and
    roller means affixed to said frame adapted for translating said frame along a top of a pipe.

* * * * *